United States Patent [19]

Ishida et al.

[11] Patent Number: 4,580,457
[45] Date of Patent: Apr. 8, 1986

[54] MANUAL OR HYDRAULIC GEARSHIFTING APPARATUS

[75] Inventors: Hisao Ishida, Tokyo; Yutaka Kojima, Saitama, both of Japan

[73] Assignee: Isuzu Motors, Ltd., Japan

[21] Appl. No.: 622,770

[22] Filed: Jun. 20, 1984

[30] Foreign Application Priority Data

Jun. 29, 1983 [JP] Japan .................. 58-116148

[51] Int. Cl.$^4$ .................. B60K 20/10; B60K 20/14
[52] U.S. Cl. .................. 74/335; 74/625; 74/473 R
[58] Field of Search ........... 74/471 XY, 473 R, 335, 74/625

[56] References Cited

U.S. PATENT DOCUMENTS

| | | | |
|---|---|---|---|
| 1,121,413 | 12/1914 | Spear | 74/473 R X |
| 2,137,939 | 11/1938 | Eaton | 74/335 X |
| 2,137,953 | 11/1938 | Rowley | 74/335 X |
| 2,137,959 | 11/1938 | Turek | 74/335 X |
| 2,137,961 | 11/1938 | Vorech | 74/335 X |
| 2,157,592 | 5/1939 | Casler | 74/335 |
| 2,200,013 | 5/1940 | Sanford | 74/335 X |
| 2,931,237 | 4/1960 | Backus | 74/335 |
| 3,248,962 | 5/1966 | McNamara et al. | 74/339 |
| 4,463,628 | 8/1984 | Ahlschwede et al. | 74/625 X |

Primary Examiner—George H. Krizmanich
Assistant Examiner—Dirk Wright
Attorney, Agent, or Firm—John E. Toupal; Harold G. Jarcho

[57] ABSTRACT

A vehicle transmission control apparatus including a plurality of shift members for operating a vehicle transmission; a lever adapted for movement in one sense into a plurality of positions, one end of the lever being operatively coupled to a different one of the shift members in each of the positions; the lever being further adapted for pivotal movement in response to which the one end of the lever actuates the operatively coupled shift member; a select actuator comprising a select cylinder and a select piston retained thereby, the select piston being coupled to the lever and hydraulically controlled to produce the movement thereof in the one sense; a shift actuator comprising a hydraulic cylinder and a shift piston retained thereby, the shift piston being coupled to the lever and hydraulically controlled to produce the pivotal movement thereof and a control member coupled to the lever and manually operable to produce therefor both the pivotal movement and the movement in the one sense.

15 Claims, 4 Drawing Figures

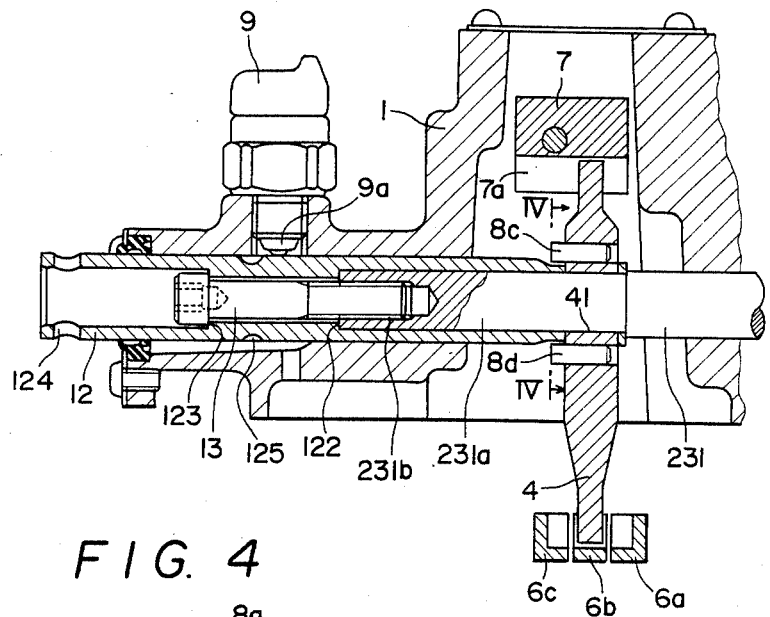
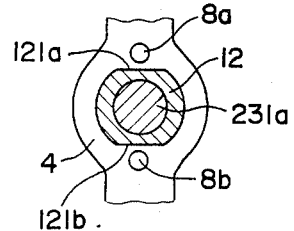

MANUAL OR HYDRAULIC GEARSHIFTING APPARATUS

BACKGROUND OF THE INVENTION

The present invention relates generally to fluid pressure actuators and, more particularly, to a fluid pressure actuator suitable for operating the transmission of a vehicle.

Disclosed in U.S. Pat. No. 3,248,962 is an arrangement wherein an automatic vehicle transmission is shifted with a fluid pressure actuator. In the system disclosed, each of a plurality of shift rods is provided with an individual actuator. Because of the multiple actuators, the system is quite intricate and costly.

The object of the present invention, therefor, is to overcome the above-described inconveniences by providing an improved vehicle transmission fluid pressure actuator.

SUMMARY OF THE INVENTION

The invention is a vehicle transmission control apparatus including a plurality of shift members for operating a vehicle transmission; a lever adapted for movement in one sense into a plurality of positions, one end of the lever being operatively coupled to a different one of the shift members in each of the positions; the lever being further adapted for pivotal movement in response to which the one end of the lever actuates the operatively coupled shift member; a select actuator comprising a select cylinder and a select piston retained thereby, the select piston being coupled to the lever and hydraulically controlled to produce the movement thereof in the one sense; a shift actuator comprising a hydraulic cylinder and a shift piston retained thereby, the shift piston being coupled to the lever and hydraulically controlled to produce the pivotal movement thereof. Because all shift operations are effected by only the select actuator and the shift actuator, the composite apparatus is relatively simple and inexpensive.

According to an important feature of the invention, the control apparatus includes a control member coupled to the lever and manually operable to produce therefor both the pivotal movement and the movement in the one sense. The provision of the manual control member permits shifting of the transmission even in the absence of hydraulic pressure.

According to specific features of the invention, the select piston is coupled to a central portion of the lever and is axially movable to produce substantially linear movement thereof, the shift piston is coupled to an opposite end of the lever and movable to produce the pivotal movement thereof about the select piston, and the control member is a manual rod aligned with the select piston and axially movable to produce the linear movement of the lever and rotatable to produce the pivotal movement thereof. These features provide the desired functions in a simple structural arrangement.

According to still other features of the invention the select piston is coupled to the lever with a coupling means that permits relative rotational movement therebetween, the manual rod is fixed to the select piston so as to be rotatable therewith, and the coupling means comprises limit means for engaging the select piston and the lever for common rotation after a predetermined degree of the relative rotational movement therebetween. These features minimize seal wear in the select actuator by eliminating regular rotation of the select piston.

According to yet another feature, there is provided an indicator system for indicating the operative position of the control member. This feature allows a driver to manually select a proper gear.

DESCRIPTION OF THE DRAWINGS

These and other objects and features of the invention will become more apparent upon a perusal of the following description taken in conjunction with the accompanying drawings wherein:

FIG. 3 is a schematic cross-sectional view of another embodiment of the invention; and FIG. 4 is a schematic cross-sectional view taken along lines IV—IV of FIG. 3.

DESCRIPTION OF THE PREFERRED EMBODIMENTS

Figure 1:
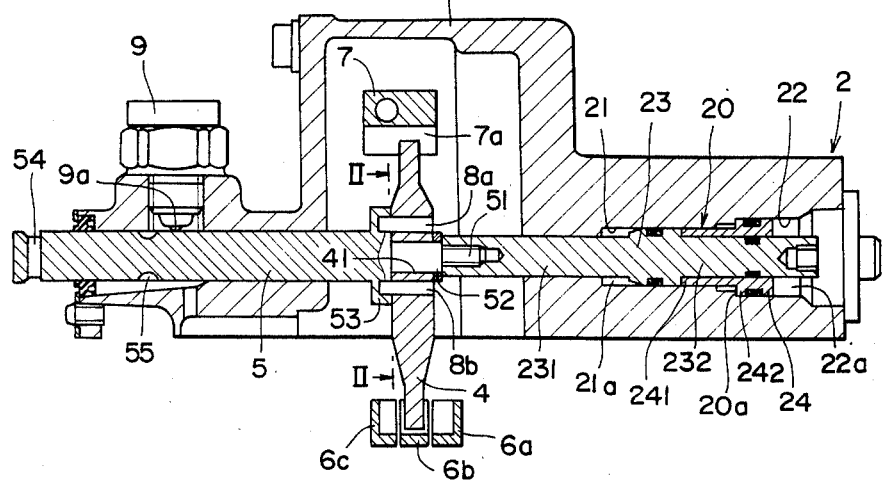
FIG. 1 is a schematic cross-sectional view of one embodiment of the invention.
Figure 2:
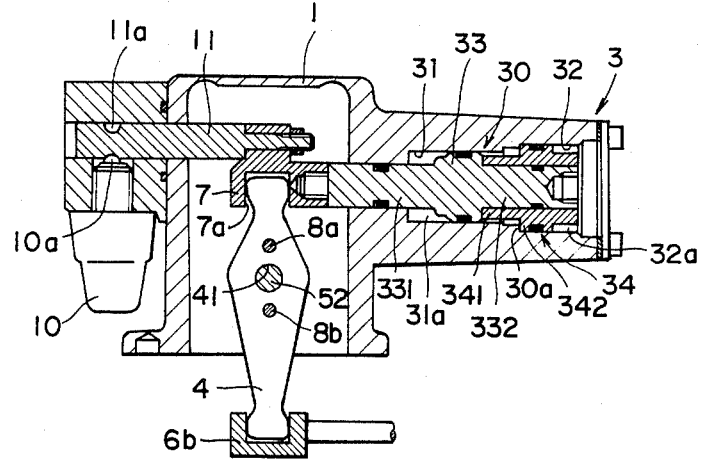
FIG. 2 is a schematic cross-sectional view taken along lines II—II of FIG. 1.

Illustrated in FIGS. 1 and 2 is an actuator casing 1 in which are disposed a first or select actuator 2 and a second or shift actuator 3 disposed above and at a right angle to the first actuator 2. As shown in FIG. 1, the select actuator 2 comprises a stepped cylinder 20 formed in the casing 1 and having a small diameter portion 21 and a large diameter portion 22, a first piston 23 disposed slidably within the small diameter portion 21 of the cylinder 20, a piston rod 231 formed integrally with the first piston 23 and extending into the casing 1, and an externally stepped cylindrical second piston 24 having a small outer diameter portion 241 and a large outer diameter portion 242. The small diameter portion 241 is slidably received by the small diameter portion 21 of the cylinder 20 and the large diameter portion 242 is slidably received by the large diameter portion 22 of the cylinder 20. Slidably received by the cylindrical interior of the second piston 24 is a piston rod 232 formed integral with the first piston 23 and extending from a side thereof opposite the piston rod 231.

Defined between the small diameter portion 21 of the cylinder 20, the first piston 21 and the piston rod 231 of reduced diameter is an annular oil pressure chamber 21a. Another annular oil pressure chamber 22a is defined between the large diameter portion 22 of the cylinder 20, surfaces of the piston rod 232 and the large diameter portion 242 of the second piston 24, and an end cap closing the cylinder 20. Accordingly, when oil from a source (not shown) is fed under pressure into both chambers 21a and 22a of the stepped cylinder 20, the large diameter portion 242 of the second piston 24 is forced into abutment with a shoulder 20a of the stepped cylinder 20 and the first piston 23 is forced into abutment with the second piston 24 producing the neutral position as shown. Conversely, when oil pressure is exerted only in the oil pressure chamber 21a, both the first piston 23 and the second piston 24 are forced to the right as viewed in FIG. 1. Finally, when oil pressure is present only in the oil pressure chamber 22a, a force is exerted on the piston rod 232 that moves only the first piston 23 to the left as shown in FIG. 1. The first piston 23, therefore, can be actuated into three distinct positions.

The shift actuator 3, has a construction similar to the select actuator 2. As shown in FIG. 2, the shift actuator includes a stepped cylinder 30 having a small diameter portion 31 and a large diameter portion 32 formed in the casing 1, a first piston 33 slidably disposed within the small diameter portion 31 of the stepped cylinder 30, a piston rod 331 formed integrally with the first piston 33 and extending into the casing 1, and a cylindrical second piston 34. The interior of the second piston 34 is slidably fitted over a piston rod 332 integrally formed with the first piston 33 and extending from one end thereof opposite the piston rod 331. Slidably receiving a small diameter portion 341 and a large diameter portion 342 of the second piston 34, respectively, are the small diameter portion 31 and the large diameter portion 32 of the cylinder 30. The first piston 33, the piston rod 331 and the small diameter portion 31 of the cylinder 30 define an annular pressure chamber 31a while the large diameter portion 32, surfaces of the second piston 34 and the piston rod 332, and an end cap covering the cylinder 30 define an annular pressure chamber 32a. As can the first piston 23 of the above described select actuator 2, the first piston 33 can be actuated into three positions, namely, the illustrated neutral position, a right position and a left position, respectively, by oil pressure in both the oil pressure chambers 31a and 32a, by oil pressure in only the oil pressure chamber 31a and by oil pressure in only the oil pressure chamber 32a.

An internal lever 4 is disposed interiorly of the casing 1 and an intermediate portion thereof is coupled to a manually-operated rod 5 also fixed to the piston rod 231 of the select actuator 2. One end of the internal lever 4 can be moved into sequential engagement with shift blocks 6a, 6b, and 6c mounted on shift rods for activating, respectively, first-second gears, third-fourth gears and the fifth-reverse gears.

A bifurcated actuating member 7 is threadedly coupled on an end of the piston rod 331 of the shift actuator 3. Defined by the actuating member 7 is a yoke 7a that engages the end of the internal lever 4 opposite to the blocks 6a –6c. The yoke 7a permits movement of the internal lever 4 in response to axial movement of the select actuator 2, as shown in FIG. 1. When the piston rod 331 of the shift actuator 3 is moved to the left or to the right as viewed in FIG. 2, the actuating member 7 engages the end of the internal lever 4 and produces pivotal movement thereof. Thus, in response to selective movement of the piston rod 331 of the second actuator 3, the lever 4 will pivot counter-clockwise or clockwise as seen in FIG. 2 to actuate any one of the shift rods 6a, 6b or 6c selected by the position of the piston rod 231 of the select actuator.

The aforementioned manually-operated rod 5 is disposed on the same axis as that of the piston rod 231 and is slidably and rotatably supported in the casing 1. On one end of the manually-operated rod 5 are external threads 51 engaging a threaded hole formed in an end of the piston rod 231 of the select actuator 2. Directly adjacent to the threaded end 51 of the manually-operated rod 5 is a small diameter portion 52 that is received by a hole 41 formed in an intermediate portion of the internal lever 4. Securing the internal lever 4 to the manually-operated rod 5 are pins 8a, 8b pressed through openings in the lever 4 and into openings in a flange 53 formed integrally with the manually-operated rod 5.

The opposite end of the manually-operated rod 5 projects from the casing 1, and defines hole 54. A rod-like operating member such as a screw-driver (not shown) can be operatively coupled to the manually-operated rod 5 by insertion into the hole 54. Suitably manipulation of the inserted member can then produce either rotational or axial movement of the rod 5 whereby the internal lever 4 will effect, respectively, shift or select operations.

Retained by the casing 1 and axially spaced with respect to the rod 5 are three select position switches 9 only one of which is shown in FIG. 1. Each switch 9 has an actuator button 9a that registers with a groove 55 in the outer surface of manually-operated rod 5 at a different axial position thereof. When each actuator button 9a sequentially registers with the groove 55, its switch 9 closes to indicate a specific select position of the actuator 2.

Similarly retained by the casing 1 and axially spaced with respect to a rod 11, one end of which is secured to the actuating member 7 by a threaded coupling, are three shift position switches 10, only one of which is shown in FIG. 2. Each switch 10 has an actuator button 10a that registers with a groove 11a in the outer surface of the rod 11 at a different axial position thereof. When each actuator button 10a sequentially registers with the groove 11a its switch closes to indicate a specific shift position of the actuator 3. Accordingly, by a combination of signals from the select position switches 9 and the shift position switches 10, any specific one of the nine possible positions of the internal lever 4 can be known.

OPERATION OF THE FIRST EMBODIMENT

In response to operation of a conventional shift control mechanism (not shown) oil pressure is exerted on one or both of the oil pressure chambers 21a and 22a of the select actuator 2 to move the internal lever 4 into a predetermined select position, and oil pressure is exerted on one or both of the oil pressure chambers 31a and 32a of the shift actuator 3 to pivot the internal lever 4 into a predetermined shift position. However, in the event oil pressure is lost because of a hydraulic system failure, the actuators 2 and 3 become inoperable. In that case, a screw-driver or the like is inserted into the hole 54 and moved to axially slide the manually-operated rod 5 into a predetermined select position. In addition, the manually-operated rod 5 can be rotated by the screw-driver to pivot the internal lever 4 into a predetermined shift position. It will be apparent that the existing select and shift positions can be known by observing the visual output produced by the switches 9 and 10 in response to movement of the manually-operated rod 5. Thus, by the aforementioned select and shift operations, a transmission can be shifted into a desired gear, for example first, whereby a vehicle can be driven to a repair shop and a tow vehicle is not required.

FIGS. 3 and 4 show another embodiment in which components the same as those shown in the above-described embodiment bear identical reference numerals. Projecting from the piston rod 231 of the first actuator 2 (select actuator) is a reentrant small diameter portion 231a provided with a threaded hole 231b at the end thereof. A hole 41 provided in the intermediate portion of the internal lever 4 accommodates and is pivotably supported by the stepped small diameter portion 231a. A manually-operated rod 12, corresponding to the manually-operated rod 5, has a hollow configuration with a reduced internal diameter central portion that defines shoulders 122 and 123. One end of the hollow rod 12 receives the reentrant portion 231a of the piston rod 231. A fastening bolt 13 engages the threaded hole 231b in the small diameter portion 231a such that the foremost end thereof abuts against the shoulder 122 of the manually-operated rod 12. Also, a head of the fastening bolt 13 abuts against the shoulder 123 so that the manually-operated rod 12 is fixed to the piston rod 231. The opposite end of the manually-operated rod 12 projects from the casing 1 and defines a hole 124 into which an operating member such as a screw-driver can be inserted. Again, the outer periphery of the manually-operated rod 12 possesses a groove 125 that registers sequentially with actuator buttons 9a of select position switches 9 only one of which is shown. Formed on the outer surface of the manually-operated rod 12 and terminating at the inner end thereof, are diametrically spaced apart, flattened surfaces 121a and 121b parallel to each other, as shown in FIG. 4. Pins 8a and 8b retained by openings in the internal lever 4, project, respectively, directly adjacent to the flattened surfaces 121a and 121b.

OPERATION OF THE SECOND EMBODIMENT

A screw-driver inserted into the hole 124 can be used to axially slide the manually-operated rod 12 and thereby move the internal lever 4 in an axial direction to effect select operations. In addition, when the manually-operated rod 12 is rotated the flattened surfaces 121a and 121b move into abutment against either of the pins 8a and 8b and further rotation pivots the internal lever 4 to effect shift operations. Therefore, operation and results similar to those attained by the embodiment of FIGS. 1 and 2 can be obtained with the embodiment of FIGS. 3 and 4. In this case, however, the internal lever 4 can pivot about the stepped small diameter portion 231a of the piston rod 231 until the limit pins 8a and 8d engage the flattened limit surfaces 121a and 121b. Therefore, when normal operation of the actuator 3 produces only limited pivotal movement of the internal lever 4, the piston rod 231 does not pivot and wear of a seal ring mounted on the piston 33 is reduced.

As described above, the manually-operated rod 12 is disposed on the same axis as that of the piston rod 231 of the first actuator 2 (select actuator) whereby the internal lever 4 may be either moved in an axial direction or pivoted. Therefore, even after a fluid pressure failure renders the actuators 2 and 3 inoperable, the manually-operated rod 12 can be manipulated to perform select and shift operations of the internal lever 4. A predetermined transmission gear can thereby be attained, and even after a fluid pressure failure, the vehicle can be driven to a repair shop.

Obviously, many modifications and variations of the present invention are possible in light of the above teachings. For example, while in the described embodiments, the first actuator 2 is used as the select actuator and the second actuator 3 used as the shift actuator, the first actuator can be used as the shift actuator and the second actuator used as the select actuator, in which case, both the actuators can be arranged in positions rotated through 90° on a horizontal surface. Also, although oil pressure has been described as an actuating fluid air pressure can be used. It is to be understood, therefore, that the invention can be practiced otherwise than as specifically described.

What is claimed is:

1. A vehicle transmission control apparatus comprising:
   a plurality of shift members for operating a vehicle transmission;
   a lever adapted for linear movement into a plurality of positions, one end of said lever being operatively coupled to a different one of said shift members in each of said positions; said lever being further adapted for pivotal movement in response to which said one end of said lever actuates said operatively coupled shift member;
   a select actuator means comprising a select hydraulic cylinder and a select piston retained thereby, said select piston being coupled to said lever and hydraulically controlled to produce said linear movement thereof;
   a shift actuator means comprising a shift hydraulic cylinder and a shift piston retained thereby, said shift piston being coupled to said lever and hydraulically controlled to produce said pivotal movement thereof;
   a casing means retaining said lever, said select actuator means, and said shift actuator means; and
   a control member comprising a portion within said casing means and coupled to said lever and a manually accessible portion always disposed outside said casing means and having means adapted for manual actuation to produce either said linear or said pivotal movement of said lever.

2. An apparatus according to claim 1 wherein a first of said pistons is coupled to a central portion of said lever and is axially movable to produce said linear movement thereof, and a second of said pistons is coupled to an opposite end of said lever and movable to produce said pivotal movement thereof about said first piston.

3. An apparatus according to claim 2 wherein said control member comprises a manual rod axially movable to produce said linear movement of said lever and rotatable to produce said pivotal movement thereof.

4. An apparatus according to claim 3 wherein said manual rod is axially aligned with said first said piston.

5. An apparatus according to claim 4 wherein said select piston is said first piston and said second piston is said shift piston.

6. An apparatus according to claim 5 wherein said select piston is fixed to said lever so as to be rotatable in response to said pivotal movement thereof.

7. An apparatus according to claim 6 including a casing means retaining said lever, said select actuator means, and said shift actuator means, and wherein said control member comprises a portion within said casing means and coupled to said lever and a manually accessible portion disposed outside said casing means.

8. An apparatus according to claim 5 wherein said select piston is coupled to said lever with a coupling means that permits relative rotational movement therebetween.

9. An apparatus according to claim 8 wherein said manual rod is fixed to said select piston so as to be rotatable therewith, and said coupling means comprises limit means for engaging said select piston and said lever for common rotation after a predetermined degree of said relative rotational movement therebetween.

10. An apparatus according to claim 9 including a casing means retaining said lever, said select actuator means, and said shift actuator means, and wherein said control member comprises a portion within said casing means and coupled to said lever and a manually accessible portion disposed outside said casing means.

11. An apparatus according to claim 1 including indicator means for indicating the operative position of said control member.

12. An apparatus according to claim 11 wherein said indicator means comprises electrical switch means.

13. An apparatus according to claim 12 wherein a first of said pistons is coupled to a central portion of said lever and is axially movable to produce said linear movement thereof, and a second of said pistons is coupled to an opposite end of said lever and movable to produce said pivotal movement thereof about said first piston.

14. An apparatus according to claim 13 wherein said select piston is said first piston and said second piston is said shift piston.

15. An apparatus according to claim 14 wherein said select piston is fixed to said lever so as to be rotatable in response to said pivotal movement thereof.

* * * * *

UNITED STATES PATENT AND TRADEMARK OFFICE
CERTIFICATE OF CORRECTION

PATENT NO. :   4,580,457
DATED      :   April 8, 1986
INVENTOR(S) :  Hisao Ishida and Yutaka Kojima It is certified that error appears in the above-identified patent and that said Letters Patent is hereby corrected as shown below:

On the title page of the patent insert Assignee:

--Assignee:   Diesel Kiki Co., Ltd., Japan--.

Signed and Sealed this

Seventeenth Day of October, 1989

Attest:

DONALD J. QUIGG

Attesting Officer

Commissioner of Patents and Trademarks